United States Patent [19]

Gadow

[11] Patent Number: 5,061,130

[45] Date of Patent: Oct. 29, 1991

[54] APPARATUS FOR STABILIZING BOX-TYPE SPEAKERS ON FLOOR OF VEHICLE

[76] Inventor: Mitchell T. Gadow, 1601 E. 20th, Pittsburg, Kans. 66762

[21] Appl. No.: 561,314

[22] Filed: Aug. 1, 1990

[51] Int. Cl.$^5$ ............................................. B60P 7/00
[52] U.S. Cl. .................................... 410/104; 410/97; 410/115
[58] Field of Search .................... 410/96, 97, 98, 101, 410/104, 105, 106, 107, 108, 109, 110, 111, 112, 113, 114, 115, 116

[56] References Cited

U.S. PATENT DOCUMENTS

| | | | |
|---|---|---|---|
| 2,605,064 | 7/1952 | Davis | 410/105 |
| 2,688,289 | 9/1954 | Sterling | 410/104 |
| 2,735,377 | 2/1956 | Elsner | 410/105 |
| 2,891,490 | 6/1959 | Elsner | 410/105 |
| 3,313,511 | 4/1967 | Koerner et al. | 248/361 |
| 3,478,995 | 11/1969 | Lautzenhiser et al. | 410/104 |
| 3,601,349 | 8/1971 | Murphy, Jr. | 410/104 |
| 3,685,778 | 8/1972 | Berns | 410/116 |
| 3,877,671 | 4/1975 | Underwood et al. | 248/346 |
| 3,917,338 | 11/1975 | Becker | 410/116 |
| 4,248,558 | 2/1981 | Lechner | 410/104 |
| 4,464,089 | 8/1984 | Allen | 410/97 |
| 4,484,847 | 11/1984 | Holmes | 410/104 |
| 4,582,162 | 4/1986 | Katsuno | 181/141 |
| 4,733,748 | 3/1988 | Ponticelli, Jr. | 181/141 |
| 4,815,558 | 3/1989 | Krainhofer | 181/141 |

OTHER PUBLICATIONS

New Products Listing: New Machines MTX TT103, Aug. 1990, Car Audio Electronics Magazine.

*Primary Examiner*—Frank E. Werner
*Assistant Examiner*—Eller, Jr. James T.
*Attorney, Agent, or Firm*—Hovey, Williams, Timmons & Collins

[57] ABSTRACT

Apparatus (10) is provided for stabilizing and inhibiting overturning of equipment such as large audio speakers (74) which may be carried in a van or other vehicle and are subject to movement therein. The apparatus (10) includes a pair of separate, relatively adjustable rail-like base elements (12, 14) a pair of coupling members (16, 18) associated with each base element (12, 14), and securement straps (20, 22) connected between each pair of coupling members (16, 18).

4 Claims, 1 Drawing Sheet

APPARATUS FOR STABILIZING BOX-TYPE SPEAKERS ON FLOOR OF VEHICLE

BACKGROUND OF THE INVENTION

1. Field of the Invention

This invention is broadly concerned with apparatus for stabilizing and inhibiting overturning of equipment such as large audio speakers which may be carried in a van or other vehicle and are subject to movement therein. More particularly, it is concerned with such apparatus in which a pair of separate, relatively adjustable rail-like base elements are inserted beneath equipment and straps are extended about the equipment and tightly connected to the base elements to thereby provide a more stable base.

2. Description of the Prior Art

Certain equipment that is meant to stand upright or to remain in a particular orientation is often prevented from doing so because of the instability of the support structure on which the equipment rests. A common example of this is a box-type, audio speaker positioned on the floor of a vehicle. Sharp turns and quick stops can cause the speaker to turn over or be thrown its desired orientation during transportation.

A variety of devices are known in the art for securing equipment in a particular position or location. U.S. Pat. No. 3,478,995 discloses a tie-down apparatus including a honeycomb panel in which a pair of tie-down channels are secured to upper and lower plates of a rectangular base of the honeycomb structure and cooperate with a male or female attachment and straps for tying down equipment. Devices such as these are somewhat limited in their application, however, because of the non-adjustable size and bulk of the base assembly.

SUMMARY OF THE INVENTION

The present invention overcomes the problem outlined above, and provides a less bulky stabilizing apparatus with a more easily adjustable base. Broadly speaking, the apparatus of the invention includes a pair of elongated, separate base elements adapted to rest upon a support surface. The base elements are relatively laterally shiftable in order to accommodate equipment of varying size. A pair of coupling members are operatively secured to each of the base elements and slidable along the lengths thereof, these coupling members preferably being in the form of shiftable female collars. Finally, an elongated securement strap is operatively connected between each pair of coupling members and is adapted to extend about the equipment. The straps include means for adjustably tightening each strap in order to releasably secure the equipment to the base elements.

BRIEF DESCRIPTION OF THE DRAWING FIGURES

A preferred embodiment of the present invention is described in detail below with reference to the attached drawing figures, wherein.

DETAILED DESCRIPTION OF A PREFERRED EMBODIMENT

Figure 1:
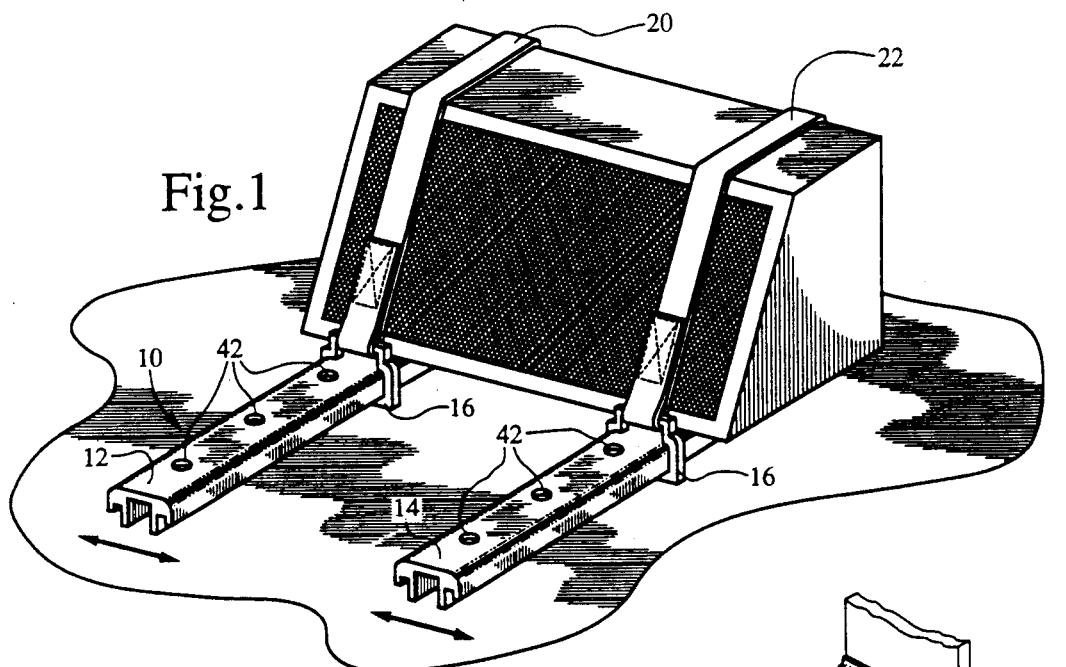
FIG. 1 is an isometric view of the preferred stabilizing apparatus of the invention, supporting an audio speaker.

Referring now to the drawings, and particularly FIG. 1, stabilizing apparatus 10 is illustrated. The apparatus 10 includes two base elements 12, 14, a pair of coupling members 16, 18 (see FIG. 3) associated with each base element 12, 14, and securement straps 20, 22 connected between each pair of coupling members 16, 18.

Figure 2:
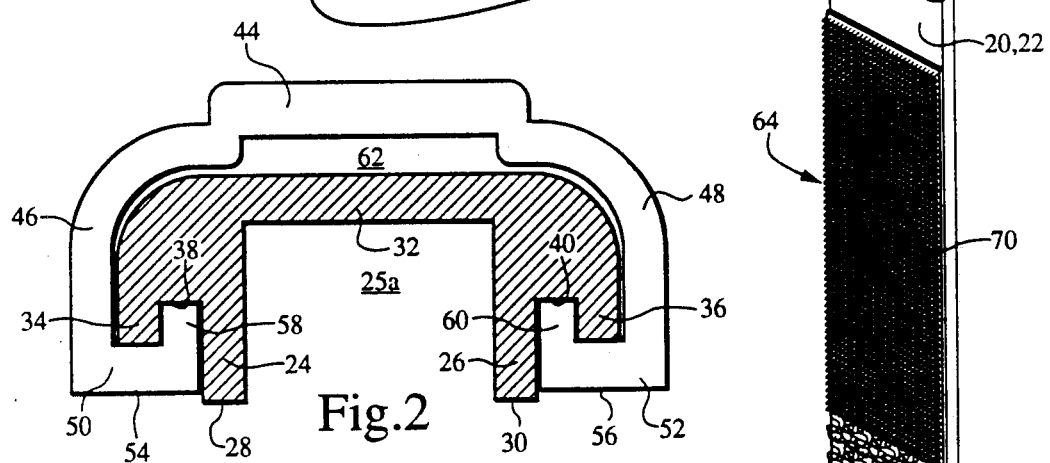
FIG. 2 is a vertical sectional view of a base element forming a part of the stabilizing apparatus, with a coupling member operatively connected to the base element.

In more detail, base elements 12, 14 are elongated, integral rails of inverted, somewhat U-shaped configuration, preferably formed of lightweight aluminum. The structure of base elements 12, 14 is best illustrated in FIG. 2 and includes laterally spaced, marginal legs 24, 26 with a central recess 25a between the legs 24, 26. The legs 24, 26 present flattened, support surface-engaging undersides 28, 30 at the lower ends thereof, and are interconnected by a central bridge section 32 adjacent the upper ends. Arcuate side skirts 34, 36 extend downwardly from either side of central bridge section 32 and likewise extend the full length of the base element 12, 14. The side skirts 34, 36 terminate above the surfaces 28, 30 as illustrated in FIG. 2, and elongated, continuous, side marginal recesses 38, 40 are defined between the legs 24, 26 and associated skirts 34, 36. A series of axially spaced apart apertures 42 are also provided along the length of the elements 12, 14, as shown in FIG. 1.

The coupling members 16, 18 are identical and each comprises a collar with a straight, elongated upper section 44. Each side section 46, 48 of the coupling members 16, 18 extends arcuately downward from the upper section 44 and each has an inwardly extending leg 50, 52 which presents a flat, lower surface 54, 56. The inboard ends of the legs 50, 52 terminate in upstanding projections 58, 60 which are received within the recesses 38, 40. The upper section 44 of the coupling members 16, 18 is slightly raised in the center thereof to form a central recess 62.

The coupling member 18 is shown coupled with base element 14 in FIG. 2. As illustrated, coupling member 18 slidably fits around the central bridge 32 and side skirts 34, 36 of base element 14. The inwardly extending legs 50, 52 of coupling member 18 extend underneath the side skirts 34, 36 so that the upstanding projections 58, 60 fit within the side marginal recesses 38, 40 of base element 14. The flat, lower surfaces 54, 56 of the coupling members are kept from contacting the support surface by the legs 24, 26 of base elements 12, 14.

Figure 3:
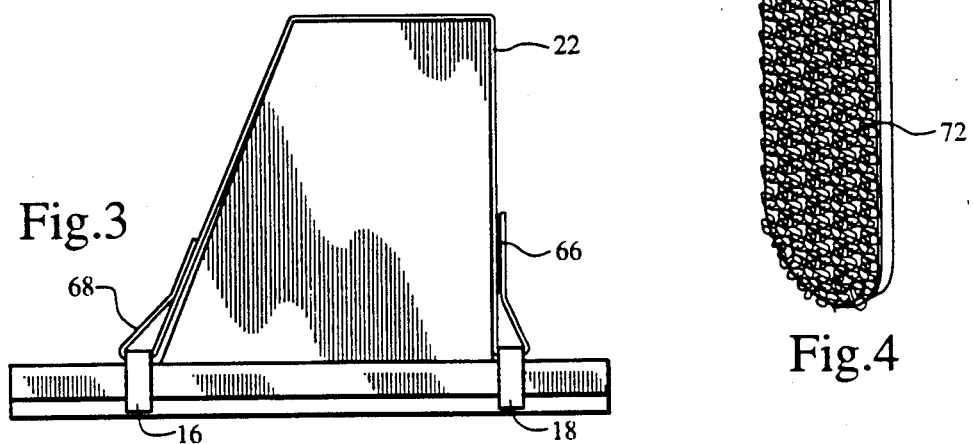
FIG. 3 is a side elevational view of the apparatus depicted in FIG. 1.
Figure 4:
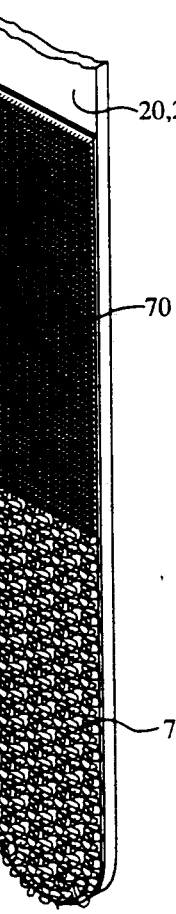
FIG. 4 is a fragmentary perspective view of the tightening means associated with each strap.

The apparatus 10 further includes elongated securement straps 20, 22. As illustrated in FIGS. 3 and 4, each strap 20, 22 is fixedly attached at one end 68 to an associated coupling member 16 by a sewn connector. The opposite, free end 66 of each strap provides tightening means 64 which includes mating VELCRO hook and loop material portions 70, 72 configured for passing through a central recess 62 of an appropriate coupling member 16, 18. The mating portions 70, 72 are shown being in face-to-face relationship.

Operation of the apparatus 10 will be described in the context of its use with a box-type speaker unit 74, as shown in FIG. 1. First, each pair of collar elements 16, 18 are moved apart and the speaker 74 is placed atop both base elements 12, 14 and between each pair of coupling members 16, 18. Free movement of the coupling members along the length of the base elements 12, 14 is promoted by the action of the legs 24, 26 acting as a base and thereby preventing motion-inhibiting contact of the lower surfaces 54, 56 of the coupling members 16, 18 with the support surface. The coupling members 16, 18 are then moved as closely as possible to the edges of speaker 74 and the straps 20, 22 are placed about the body of the speaker. The free end 66 of each strap 20, 22 is then passed through the central recess 62 of an associated coupling member 18. The straps 20, 22 are pulled through the central recess 62 in order to achieve a snug fit about the speaker 74. The straps 20, 22 are held in this snug position by the coupling action of the mating VELCRO hook and loop material portions 70, 72. Longitudinal movement of the coupling members 16, 18 is prevented by the tensile forces exerted thereon by the straps 20, 22.

The base elements 12, 14 are firmly in place against the bottom side of the speaker 74 and will thereby provide a more stable base which better assures that the speaker 74 will remain in its desired orientation. Apertures 42 in the base elements 12, 14 are also provided if it is desired to secure the apparatus to a support structure, which in the case of speaker 74 would most likely be the floor of a vehicle.

Although the invention has been described with reference to the illustrated preferred embodiment, it is noted that substitutions may be made and equivalents employed herein without departing from the scope of the invention as recited in the claims.

I claim:

1. An apparatus for stabilizing a piece of equipment that is provided with a lower bearing surface defined by a predetermined area, the apparatus comprising:

a pair of independent, elongated base elements adapted to be spaced from one another and attached to the piece of equipment, each of the elements including a bottom surface adapted to rest upon a support surface and an upper equipment-engaging surface adapted to rest against the lower bearing surface of the equipment, the bottom surfaces defining a support area extending between and including the bottom surfaces, the support area being greater than the predetermined area of the lower bearing surface of the piece of equipment;

a pair of coupling members operatively secured to each of the base elements, at least one of the coupling members being movable relative to the base element so that the coupling members may be spaced from one another along the base element; and an elongated securement strap operatively connected between the pair of coupling members on each base element, each of the securement straps including means for adjustably tightening the strap in order to permit the strap to secure the piece of equipment to the base element associated therewith, wherein each of the base elements is formed of an elongated rail including a pair of lateral marginal recesses extending from the bottom surface toward the upper equipment-engaging surface, each of the coupling members including a collar configured to extend across the upper equipment-engaging surface and into each of the lateral marginal recesses, whereby the apparatus and equipment placed thereon is supported solely by the bottom surface of the elongated rails, the coupling members being freely movable along the elongated rails when the elongated rails are supported by the support surface.

2. The apparatus as recited in claim 1, wherein each of the base elements includes a pair of laterally spaced legs which together define the bottom surface of the base element.

3. The apparatus as recited in claim 1, wherein each strap is provided with a first terminal section and tightening means includes adjacent mating hook and loop material portions, the terminal section being adapted for receipt through one of the collars for presenting the adjacent portions to one another so that the portions may be mated.

4. The apparatus as recited in claim 1, wherein each of the base elements includes at least one aperture extending between the upper equipment-engaging surface and the bottom surface for permitting selective connection of the base element to the support surface.

* * * * *